United States Patent [19]

Burkhardt et al.

[11] Patent Number: 4,759,665
[45] Date of Patent: Jul. 26, 1988

[54] CONSOLIDATING AND/OR SEALING SOILS AND COMPOSITION THEREFOR

[75] Inventors: Rudolf Burkhardt, Troisdorf; Hansjürgen Hass, Troisdorf-Spich, both of Fed. Rep. of Germany

[73] Assignee: Dynamit Nobel AG, Troisdorf Bez Cologne, Fed. Rep. of Germany

[21] Appl. No.: 945,217

[22] Filed: Dec. 19, 1986

Related U.S. Application Data

[63] Continuation of Ser. No. 842,733, Mar. 21, 1986, abandoned, which is a continuation of Ser. No. 639,303, Aug. 8, 1984, abandoned.

[30] Foreign Application Priority Data

Aug. 13, 1983 [DE] Fed. Rep. of Germany ....... 3329403

[51] Int. Cl.$^4$ .................... B01J 13/00; C09K 17/00; F02D 3/12
[52] U.S. Cl. .................... 405/264; 106/74; 252/315.2; 252/315.5; 252/315.6; 405/270
[58] Field of Search ............... 252/315.2, 315.5, 315.6; 405/263, 264, 270; 106/74

[56] References Cited

U.S. PATENT DOCUMENTS

| | | | |
|---|---|---|---|
| 2,281,810 | 5/1942 | Stone et al. | 252/315.6 X |
| 2,842,444 | 7/1958 | Emblem et al. | 106/38.3 |
| 3,704,594 | 12/1972 | Davis | 405/264 |
| 4,056,937 | 11/1977 | Suzuki | 405/264 |
| 4,074,536 | 2/1978 | Young | 405/264 |
| 4,316,807 | 2/1982 | McDaniel et al. | 252/315.2 X |

FOREIGN PATENT DOCUMENTS 51-78008  7/1976  Japan .................. 405/264

Primary Examiner—Richard D. Lovering
Attorney, Agent, or Firm—Felfe & Lynch

[57] ABSTRACT

A soil injection agent on an alkali metal silicate basis, containing as gelling agent trialkoxysilanes of the formula R-Si(OR')$_3$, in which R is an aliphatic moiety of 1 to 6 carbon atoms and R' represents equal or different alkyl moieties of 1 to 4 carbon atoms, is adjusted for properties by the addition of acid alkali metal phosphates or ammonium phosphates and/or phosphoric acid. The addition improves the sealing and strengthening action of the gels and permits a reduction of the silane content, without impairing the resistance of the gels to pollutants.

7 Claims, 2 Drawing Sheets

CONSOLIDATING AND/OR SEALING SOILS AND COMPOSITION THEREFOR

This application is a continuation of application Ser. No. 842,733, filed Mar. 21, 1986 (now abandoned) which was a continuation of Ser. No. 639,303, filed Aug. 8, 1984 (now abandoned).

BACKGROUND OF THE INVENTION

The invention relates to a gel-forming mixture of alkali metal silicate, water, one or more trialkoxysilanes of the formula R-Si(OR')$_3$, in which R is an aliphatic moiety of 1 to 6 carbon atoms and R' represents equal or different alkyl moieties of 1 to 4 carbon atoms, as gelling agent, and an additional substance for adjusting the setting time and/or gel strength.

Examples of trialkoxysilanes suitable for use in the invention are n-propyltrimethoxysilane, isobutyltrimethoxysilane, n-propyltriethoxysilane, isobutyltriethoxysilane and vinyltrimethoxysilane.

Liquid mixtures which contain in appropriate amounts the alkali metal silicates, water and trialkoxysilanes of the formula R-Si(OR')$_3$ form gels of low permeability to water, and a strength that increases with the passage of time (cf. German Offenlegungsschrift No. 31 51 680). By the injection of the liquid mixtures into permeable, unstable soils, these soils can be sealed and stabilized. The setting time of the mixtures and the strength of the resultant gels can be affected by additive substances. These substances can be, for example, hydroxides and alkalinely reacting salts of the alkali metals or known agents for gelling alkali silicate solutions.

The gel-forming injection mixtures containing trialkoxysilanes are also used for preventing the penetration of pollutants into ground water.

It is the object of the present invention to obtain an improved composition for gel-forming mixtures of alkali metal silicate, water and a trialkoxysilane, with an additive to provide good control of setting times and gel properties.

THE INVENTION

Figure 1:
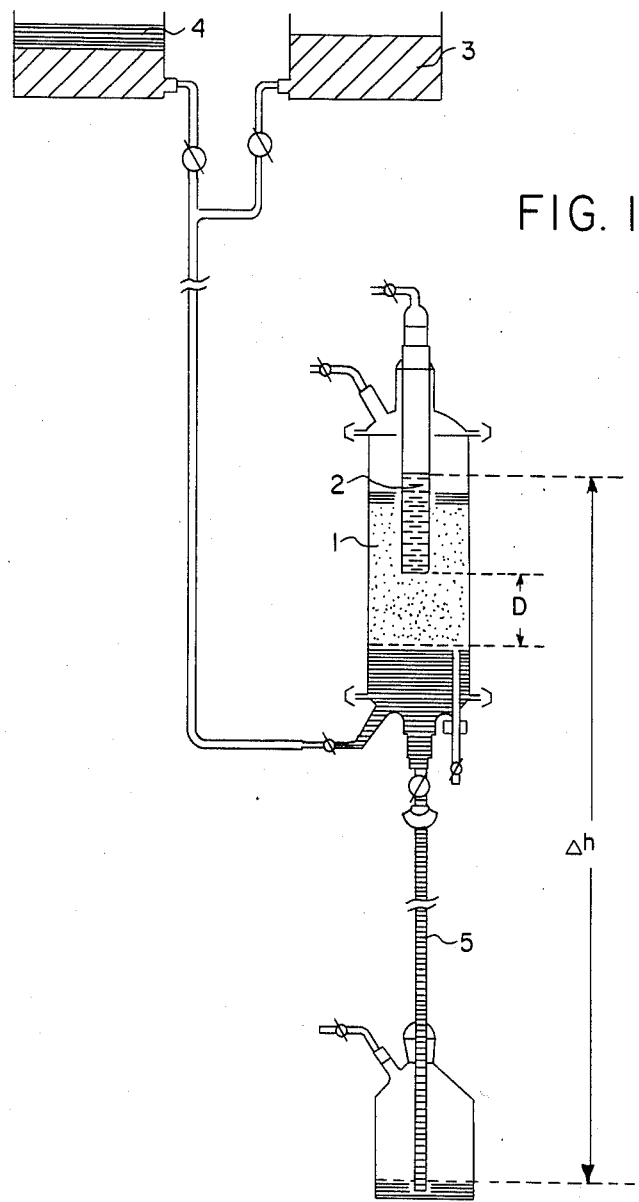
FIG. 1 depicts laboratory apparatus in its arrangement for testing the sealing action and pollutant resistance of the invention.

The present invention is in an improved composition for gel-forming mixtures of alkali metal silicate, water and a trialkoxysilane, with an additive to provide good control of setting times and gel properties wherein an additive substance as acid alkali metal phosphate or ammonium phosphate and/or phosphoric acid is introduced into the mixture.

Sodium phosphates or potassium phosphates with an excess of phosphoric acid are used preferentially, the composition corresponding to a molar ratio of phosphoric acid to sodium hydroxide or potassium hydroxide equal to 1.01 to 1.2:1.

The additives are used in the form of a 2 to 15% aqueous solution having a pH of about 2 to 4.

By the addition of acid phosphates and/or phosphoric acid in accordance with the invention to gel-forming mixtures of alkali metal silicates (water glass), water and trialkoxysilanes, the following advantages are achieved:

1. The setting times of the mixtures can be controlled both by the amount of silane and by the amount of phosphate. It is therefore possible to prepare mixtures having the same setting time but different silane and phosphate contents, and therefore also different properties adapted to the particular application involved.

2. The increase of the gel strength takes place more rapidly, and the gel strength reaches higher levels than without additive.

3. The syneresis of the gels is substantially reduced and retarded. The gels therefore have a good and lasting sealing action.

4. The silane content can be decidedly lowered without impairing the gel properties. Thus the costs of the injection mixtures can be lowered accordingly. Although when injection mixtures containing trialkoxysilanes are used only alcohols which are easily biodegradable occur as byproducts, reducing them can also be considered as an advantage.

The gels that form from the mixtures of the invention are far superior in their properties even to gels which are obtained from alkali silicate solutions by the addition of the acid phosphates and/or phosphoric acid. Disadvantages of the gels obtained in that manner are, for example, the relatively high syneresis even at low silicate concentration, which leads to a poorer and less enduring sealing action, and the poor cohesion and adhesion of the gels, with the consequence, among others, of poor resistance of the gels against flowing water and the only moderate compressive strength of the gels at higher silicate concentration despite their greater syneresis.

The mixtures of the invention form gels of high stability against aqueous solutions of chemicals and nonaqueous organic liquids. They are suitable therefore for the sealing of permeable soils not only against water, but also against liquid pollutants.

The preparation of the mixtures of the invention can be performed by known methods, according to which water glass solution and water are mixed in the desired ratio, the necessary amount of trialkoxysilane is added, possibly with the use of a mainly nonionogenic, for example alkylphenol polyglycol ethers, or anionic, for example alkylbenzene sulfonates, emulsifier or mixtures of both, and stirring until dissolved, about 10 to 45 minutes being required for this purpose.

Or, the necessary amount of trialkoxysilane is dissolved in about an equal amount of water which has been adjusted with a very small amount of mineral acid to a pH of 3 to 4, and this solution is added to the mixture of water glass and the rest of the water. The first method is usable for virtually all concentration ratios, the second, somewhat faster method for mixtures of low water glass content (<50 vol. %).

The variation of the latter method that is described in the following examples has proven advantageous, according to which the trialkoxysilane is hydrolytically dissolved in the acid phosphate solution, and the solution obtained is admixed with the alkali metal silicate solution. Suitable alkali metal silicate solutions are commercial sodium silicate solutions of 24° to 41° Be (spec. wt. 1.20 to 1.40 g/cm$^3$), especially those of 26°–32° Be (1.22–1.28 g/cm$^3$), with a molar ratio of silica to sodium oxide of 3.5:1 to 4.0:1.

For testing the sealing action and pollutant resistance, a laboratory apparatus represented in FIG. 1 was used, which was adapted to the conditions encountered in practice. It consists of a cylindrical glass vessel of 10 cm diameter, in which a sand layer 1 lies on a sieve plate. The gel-forming mixture is forced out of the supply tank 3 into the sand from the bottom, until its void volume is completely filled. After the mixture stiffens, the gel underneath the sieve plate is removed and replaced with water from the supply tank 4. The gel-and-sand mixture is loaded with pollutant in one case and water in the other through a graduated tube 2 terminating in the center of the layer 1. The hydraulic gradient $I = \Delta h/D$ is produced mainly by the suction of the water column in the tube 5.

The permeabilty coefficient k, which is given in the following examples, is, according to DARCY, $k = Q/I \cdot F$ cm/s, wherein:

Q is the amount of liquid seeping through, in cubic centimeters per second, which is read from the lowering of the level of liquid in the graduated tube 2, I is the hydraulic gradient whose value results, in accordance with FIG. 1, as the ratio from the difference in level $\Delta h$ and the thickness of the sand-and-gel layer D, and it is given in the individual examples, F is the cross section of the sand-and-gel layer, which in this experimental arrangement increases from the entry to the emergence of the liquid and therefore is taken to be the average value $F = 33.2$ cm$^2$.

As it appears from the following examples, the combination, in accordance with the invention, of trialkoxysilanes with acid phosphates in the range of low water glass concentration permits the formation of gels having extraordinarily low syneresis (Example 1), with which a correspondingly high sealing action can be achieved (Example 3). This surprising effect, namely that the addition of small amounts of trialkoxysilanes to gel-forming mixtures of water glass solution and acid phosphates very greatly retards their gelling, can be utilized for increasing both the strength and the pollutant-resistance of the gels (Example 2). The reduction of the time required for setting to useful values, which are often between 30 and 75 minutes, is achieved by increasing the amounts of acid phosphate and/or trialkoxysilane that are added. By increasing the amount of phosphate/phosphoric acid above the value possible without the addition of trialkoxysilane, it is mainly the gel strength that is achieved, and by using a higher content of trialkoxysilane the pollutant-resistance is improved. In both cases, gels of lower syneresis are obtained than when acid phosphate or trialkoxysilane alone are used, which has an advantageous effect on the sealing action.

The practical preparation and application of the mixtures of the invention can be accomplished with the equipment commonly used in injection technology. The mixing of the components is performed as hereinabove described.

EXAMPLES

Example 1

For the preparation of each batch of about 200 ml of gel, 40 ml of commercial sodium silicate solution having a density of 1.23 g·cm$^{-3}$, a silica content of 20.5 wt. % and a sodium oxide content of 5.35 wt. % was combined with water to make 100 ml, and mixed with the gelling agent solution which was also combined with water to make 100 ml. The gelling agent solution was prepared by dissolving the amounts stated in the table, of phosphoric acid (85% solution) and sodium hydroxide (98% solution) in 80 ml of water, adding the n-propyltrimethoxysilane and stirring until dissolved (10–15 minutes). During the setting time extending from the mixing of the ingredients to the hardening of the mixture, the temperature was maintained at 20° C. For the determination of the syneresis, the amount of liquid separated by gel contraction was measured and expressed as a percentage of the total volume.

Comparative tests A and B were performed with the same amount of water glass, but with only one of the two gelling agent components in each case, A with the acid phosphate solution, B with a solution of n-propyltrimethoxysilane (PTMS) in water with a pH of 3.3 (100 mg formic acid per liter of demineralized water). The agents were added in the amounts necessary for the achievement of approximately equal setting times.

| Test No. | $H_3PO_4$ g | NaOH g | PTMS g | Setting time min. | Syneresis after 20 days % | 50 days % |
|---|---|---|---|---|---|---|
| 1 | 5.20 | 1.75 | 3 | 57 | 0.1 | 0.5 |
| 2 | 5.28 | 1.78 | 3 | 42 | 0.1 | 0.5 |
| 3 | 5.35 | 1.80 | 3 | 31 | 0.1 | 0.6 |
| A | 3.90 | 1.31 | — | 42 | 1.9 | 3.4 |
| B | — | — | 9.9 | 42 | 20.8 | 35.5 |

Example 2

For the preparation of about 200 ml of gel, 100 ml of the sodium silicate solution used in Example 1 was used, being mixed without further dilution with the gelling agent solution to which water was added to make 100 ml. The gelling agent solution was prepared as described in Example 1.

Comparative test A was performed without the addition of n-propyltrimethoxysilane. In test 1, its addition results in a many times longer setting time, which is shortened in test 2 by increasing the amount of phosphoric acid and in test 3 by increasing the amount of n-propyltrimethoxysilane.

| Test No. | $H_3PO_4$ g | NaOH g | PTMS g | Setting time, min. | Gel consistency after 7 days | Synersis after 20 days % | 50 days % |
|---|---|---|---|---|---|---|---|
| A | 4.46 | 1.5 | — | 39 | solid, brittle | 6.3 | 19.0 |
| 1 | 4.46 | 1.5 | 3 | approx. 600 | soft, elastic | 1.1 | 3.5 |
| 2 | 6.30 | 2.1 | 3 | 42 | stronger than A and 3 | 1.6 | 4.0 |
| 3 | 4.46 | 1.5 | 13 | 40 | strong, elastic | 2.3 | 7.0 |

Example 3

Figure 2:
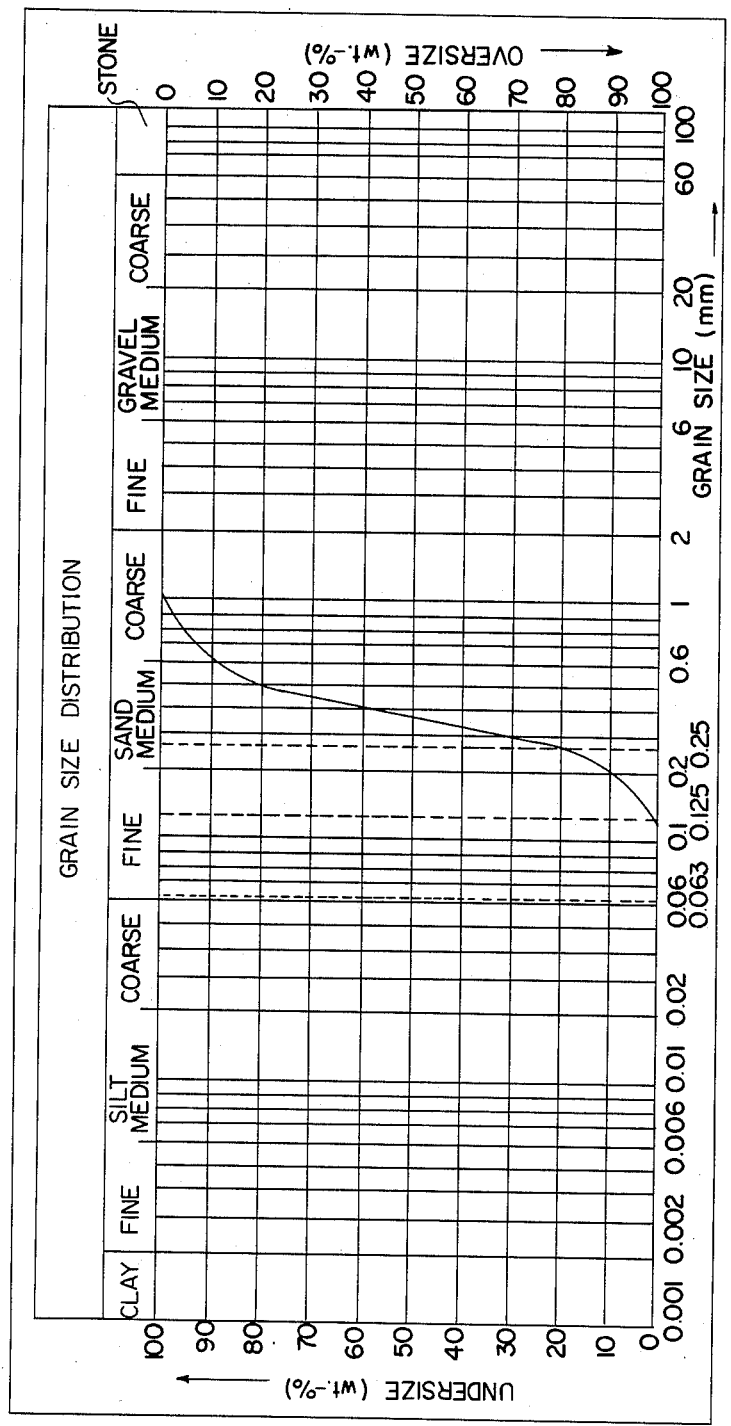
FIG. 2 shows grain size distribution of the sand used in the apparatus of FIG. 1.

To test the water permeability of sand containing the gel, medium sand of the grain size distribution given in FIG. 2 was placed in the laboratory apparatus shown in FIG. 1. An injection mixture whose preparation is described below, was forced into the sand layer:

64.2 g of 85% phosphoric acid and 21.6 g of 98% sodium hydroxide were dissolved in 1400 ml of water, and 140 g of n-propyltrimethoxysilane was added and stirred for 15 minutes until dissolved. Water was added to the solution to make 1600 ml, and was stirred into a mixture of 640 ml of sodium silicate (density = 1.25 g cm$^{-3}$, SiO$_2$=21.9 wt. %, Na$_2$O=5.7 wt. %) and 960 ml of water.

The injection mixture, which formed on the sand surface a layer about 7 mm deep, stiffened after a setting time of 41 minutes. The graduated tube 2 was filled with water, and 24 hours later a hydraulic gradient I=16 was applied by means of the tube 5. The water level in tube 2 was read daily and filled up again. The seepage amounted to a total of 17.6 ml after 42 days, and 24.5 ml after 62 days, corresponding to a k value of 8.6·10$^{-7}$ cm/s.

Example 4

To test for the permeability and resistance of gel-treated sand to pollutants, the gel-treated sand layer 1 in the laboratory apparatus of FIG. 1 was loaded with trichloroethylene in the graduated tube 2, at a hydraulic gradient I=16.8.

The gel-forming injection mixture was prepared as follows: 89.3 g of 85% phosphoric acid and 30 g of sodium hydroxide (98% solution) were dissolved in 1200 ml of water, and 90 g of isobutyltrimethoxysilane was added and stirred for 50 minutes. Water was added to the mixture to make 1500 ml, and the mixture was stirred into 1500 ml of sodium silicate (density=1.23 g cm$^{-3}$, SiO$_2$=20.5 wt. %, Na$_2$O=5.35 wt. %). The mixture had a setting time of 50 minutes.

The testing began 24 hours after setting, and terminated 81 days later. During the first 9 days, the level of the trichloroethylene in the graduated tube 2 diminished by a total of 5.3 ml. There was no further change over the next 72 days. Since the trichloroethylene which at first penetrated into the gel-and-sand layer did not pass through it, a complete sealing had been achieved (k=0 m/s).

It will be understood that the specification and examples are illustrative but not limitative of the present invention and that other embodiments within the spirit and scope of the invention will suggest themselves to those skilled in the art.

We claim:

1. A composition for consolidating and sealing soils consisting essentially of a gel-forming mixture of alkali metal silicate having a density of from 1.20 to 1.4 gm/cm$^3$, and a molar ratio of SiO$_2$:Na$_2$O of 3.5:1 to 4:1; water; one or more trialkoxysilanes of the formula R-Si(OR')$_3$, in which R is an aliphatic moiety of 1 to 6 carbon atoms and R' represents equal or different alkyl moieties of 1 to 4 carbon atoms, as gelling agent; and as an additional substance for the adjustment of the setting time and/or gel strength, an acid alkali metal phosphate or ammonium phosphate and/or phosphoric acid.

2. The composition of claim 1, wherein the additional substance is an acid alkali metal phosphate with a phosphoric acid excess, which corresponds to a molar ratio of H$_3$PO$_4$:NaOH or KOH=1.01:1 to 1.2:1.

3. The composition of claim 1, wherein the additional substance is in the form of a 2–15% aqueous solution and has a pH of 2–4.

4. The composition of claim 1, wherein the trialkoxysilane is selected from the group consisting of n-propyltrimethoxysilane, isobutyltrimethoxysilane, n-propyltriethoxysilane, isobutyltriethoxysilane and vinyltrimethoxysilane.

5. The composition of claim 1 wherein the gel-forming mixture has a density of from 1.22 to 1.28 gm/cm$^3$.

6. A method for the solidification and/or sealing of soil comprising introducing the mixture of claim 1 into said soil.

7. A method for the immobilization of pollutants in a soil comprising introducing the mixture of claim 1 into said soil.

* * * * *